(12) United States Patent
Ahmed et al.

(10) Patent No.: US 9,703,646 B2
(45) Date of Patent: Jul. 11, 2017

(54) CENTRALIZED DATABASE SYSTEM

(71) Applicant: Bank of America Corporation, Charlotte, NC (US)

(72) Inventors: Syed Taqueer Ahmed, Hyderabad (IN); Balasubramaniyam Vasudevan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 238 days.

(21) Appl. No.: 14/803,285

(22) Filed: Jul. 20, 2015

(65) Prior Publication Data
US 2017/0024288 A1    Jan. 26, 2017

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 2201/80* (2013.01); *G06F 2201/805* (2013.01); *G06F 2201/84* (2013.01)

(58) Field of Classification Search
CPC ............ G06F 11/1464; G06F 11/2082; G06F 11/1451; G06F 11/1456; G06F 11/2056; G06F 11/2094; G06F 11/1461; Y10S 707/99953
See application file for complete search history.

(56) References Cited

U.S. PATENT DOCUMENTS

| | | | |
|---|---|---|---|
| 6,704,885 B1 | 3/2004 | Salas-Meza et al. | |
| 7,266,595 B1* | 9/2007 | Black | H04L 41/0806 709/223 |
| 8,566,286 B1* | 10/2013 | Hawton | G06F 17/30 707/654 |
| 8,793,343 B1* | 7/2014 | Sorenson, III | G06F 17/30203 709/219 |
| 8,914,663 B2 | 12/2014 | Dhanalakoti et al. | |
| 2002/0010767 A1* | 1/2002 | Farrow | H04L 12/24 709/223 |
| 2002/0052876 A1* | 5/2002 | Waters | H04L 12/24 |
| 2002/0057018 A1* | 5/2002 | Branscomb | G06F 1/14 307/42 |
| 2002/0095399 A1* | 7/2002 | Devine | G06F 17/3089 |
| 2002/0165961 A1* | 11/2002 | Everdell | H04L 41/22 709/225 |
| 2003/0115145 A1* | 6/2003 | Lee | G06Q 30/02 705/54 |

(Continued)

*Primary Examiner* — Bryce Bonzo
*Assistant Examiner* — Jeison C Arcos
(74) *Attorney, Agent, or Firm* — Weiss & Arons LLP; Michael A. Springs, Esq.

(57) ABSTRACT

A centralized database system is provided. The centralized database system may include a centralized database, a plurality of database server, a plurality of backup storage devices and a plurality of CPUs. The centralized database system may include interaction between components of the centralized database system. The centralized database may receive data from the database server, the plurality of backup storage devices and a plurality of CPUs. The centralized database may also transmit instructions to the components of the centralized database system. The instructions may be associated with conflicts, CPU configurations, missing backups, communication channel throughputs and any other suitable instructions.

14 Claims, 11 Drawing Sheets

(56) References Cited

U.S. PATENT DOCUMENTS

| | | | | |
|---|---|---|---|---|
| 2004/0083197 A1* | 4/2004 | Iwata | ................ | G06F 17/30306 |
| 2004/0260973 A1* | 12/2004 | Michelman | ......... | G06F 11/1458 |
| | | | | 714/13 |
| 2005/0165867 A1* | 7/2005 | Barton | ................ | G06F 11/1464 |
| 2010/0132022 A1* | 5/2010 | Venkatasubramanian | | |
| | | | ............................ | G06F 3/0601 |
| | | | | 726/7 |
| 2011/0208611 A1* | 8/2011 | Campbell | .............. | G06Q 10/10 |
| | | | | 705/26.25 |
| 2012/0089410 A1* | 4/2012 | Mikurak | ................ | G06Q 10/00 |
| | | | | 705/1.1 |
| 2012/0259722 A1* | 10/2012 | Mikurak | ............. | G06Q 10/087 |
| | | | | 705/26.1 |

* cited by examiner

| SQL SERVERS | DPA_STARTTIME | SQL_BACKUP_END | CONFLICT IN HOURS | IS CONFLICT? |
|---|---|---|---|---|
| CXLMNO44S | 2/16/2015 11:00:00 PM | 2/16/2015 10:02:42 PM | 1 | NO |
| CXMNQR4R | 2/16/2015 11:00:00 PM | 2/16/2015 10:02:42 PM | 1 | NO |
| 000ABLR4 | 2/16/2015 11:00:00 PM | 2/16/2015 10:02:42 PM | 1 | NO |
| 04BATAR6 | 2/17/2015 12:05:00 AM | 2/16/2015 8:00:10 PM | 4 | NO |
| 07RALTAL7 | 2/17/2015 9:02:00 PM | 2/16/2015 8:04:53 PM | 1 | NO |
| RALTL704 | 2/17/2015 2:00:00 AM | 2/16/2015 6:01:54 PM | 8 | NO |
| CRPQ00041 | 2/17/2015 12:00:00 AM | 2/17/2015 5:10:20 PM | -5 | YES |
| CLSTNTS4 | 2/16/2015 11:06:00 PM | 2/16/2015 10:08:20 PM | 1 | NO |
| YYSSSBWO | 2/16/2015 11:06:00 PM | 2/16/2015 10:08:20 PM | 1 | NO |
| OTLWASO | 2/16/2015 10:30:00 PM | 2/16/2015 10:35:06 PM | 0 | YES |
| BHOAC6IL | 2/16/2015 9:04:00 PM | 2/16/2015 9:00:31 PM | 0 | YES |
| MTS4HSOO | 2/16/2015 9:04:00 PM | 2/16/2015 9:00:31 PM | 0 | YES |
| 66SSSDNT | 2/16/2015 9:04:00 PM | 2/16/2015 9:00:31 PM | 0 | YES |
| CLBHRC67 | 2/16/2015 10:00:00 PM | 2/16/2015 9:00:21 PM | 1 | NO |
| CRTVWX00 | 2/17/2015 1:01:00 AM | 2/16/2015 11:09:42 PM | 2 | NO |
| 0734WWW | 2/17/2015 12:17:00 AM | 2/17/2015 2:39:42 AM | -2 | YES |
| 65ABCDF6 | 2/17/2015 12:11:00 AM | 2/17/2015 12:02:18 AM | 0 | YES |
| ILMMAMT | 2/17/2015 12:11:00 AM | 2/17/2015 12:02:18 AM | 0 | YES |

FIG. 9

1006 Missing Services 1008

View | Properties | History | Subscriptions — 1010

1004

| | | 1014
|---|---|---|
| 1012 | | |
| SQL SERVERS | DPA_SERVERS | |
| CLSRCSQGO | WWWX012C | |
| BHWACQGO | CLSRWWWC | |
| TLWASQGO | BHWACWS3 | 1016 |
| BWSWNQ10 | IL44SA5566 | |
| WTL4WMQ1D | S6S1STBB7 | |
| 4OMMLAQFS | T10ATR1S8 | |
| ABNDAQ004 | DSNTOR99 | |
| RABATQ0H | 1SGTCABH7 | |
| SACKTQ0H | ILSAND1L48 | |
| ETDDLQ1C | 49STVMDY10 | |
| DAEDQ66 | SISTBBTTR9 | |
| ERILVEQ66 | 96E1C3TF4HD | |
| MSRRSQ66 | 441THBBATR | |
| REONANQZ9 | HEIC3TF4HD | |
| RODO101 | 4LMIL4123 | |
| VAZHKQ0M | 4ATPQRAB | |
| DSOAKTQ0N | 12ABLRVTW | |
| LISOVEQ0N | CITPLANHA3 | |
| YCTNTTQ53V1 | Srv not in DPA | 1018 |

FIG. 10

| SQL SERVERS | SQL_BACKUP_PATH | DPA_INCLUSION T | MISSING DRIVES |
|---|---|---|---|
| CXLMNO44S | \original\backup\TRS | A:\ | |
| CXMNQR4R | \dyktth\backup | B:\ | |
| 000ABLR4 | \ayrfsin\backup | C:\ | |
| 04BATAR6 | A:\MSSQL:ABRCD | A:\ | NO |
| CRPKCMMSQ1D | A:\MSSQL:SELUPWN | A:\ | NO |
| CRPKCMMSQFS4 | B:\MSSQL\BAR\UP | B:\ | NO |
| CRPRCHMSQ004 | B:\MSSQL10:MSSQL:SERVERMSSQL10BACKUP | B:\ | NO |
| CRPRCHMSQ0H | C:\MP_MSSQL_BACKUP04\MSSQL10Server\MSSQL\Backup | E:\ | NO |
| CRPRCHMSQ0H | C:\MSSQL10.crpchmsq0h\BACKUP\SystemDbs | E:\ | NO |
| CRPRCHMSQ1C | D:\MSSQL | A:\ | NO |
| CRPRCHMSQ66 | H:\MSSQLWN | A:\ | NO |
| CRPRCHMSQ66 | H:\MSSQLRSTVD0 | R:\ETL_AAA | NO |
| CRPRCHMSQ66 | H:\MSSQLSGCBackup | Q:\MSSQL\GBH\BACKUP | NO |
| CRPRCHMSQZ9 | H:\MSSQL\SSSQUP | L:\ | NO |
| CRPRDNMS101 | J:\MSSQL\SMTW | L:\ | NO |
| CRPRDNMSQ0M | H:\MSSQL\BBT | A:\ | NO |
| CRPRDNMSQ0N | H:\MSSQLYAT | B:\ | NO |
| CRPRDNMSQ0N | H:\MSSQL 1\IL\/A | B:\ | NO |

FIG. 11

CENTRALIZED DATABASE SYSTEM

FIELD OF TECHNOLOGY

This invention relates to databases. Specifically, this disclosure relates to maintaining redundancy of data stored within databases.

BACKGROUND

A crucial part of storing data is maintaining redundancy of the data. Redundant data is important because, in the event of a power failure, natural disaster or any other sort of catastrophe at one database or database location, a user can access the redundant data. A user can access the data, for example, that has been destroyed, from a second database or database location storing the redundant data.

A number of problems may arise when maintaining a redundant set of data. Some of the issues may be how often the data is backed up, how fast the data is transmitted to the second database, determining data that was not transmitted and determining sections of the second database that are blank.

Therefore, there is a need for a centralized database system. The centralized database system may ensure that all relevant data, on a first database system, is transmitted to a second database, or backup storage device. A centralized database may be connected with all components of the centralized database system. Because of the connection, the centralized database may notify and transmit instructions to the different components of the centralized database system, thereby ensuring successful transmission of data.

SUMMARY

A centralized database system for maintaining redundancy for the information stored therein is provided. The system may include a centralized database. The system may include a plurality of database servers. The system may include a plurality of backup storage devices. The system may include a plurality of central processing units ("CPUs").

Each CPU may be associated with at least one backup storage device. Each CPU may be associated with more than one backup storage device. Each CPU may also be associated with at least one database server. Each CPU may also be associated with more than one database server. Each CPU may receive instructions to change its associations at any time.

Each database server may be connected, via a communications channel, to a backup storage device. Each database server may also be configured to transmit data. The transmission may be via a communications channel. The transmission of data may be to the connected backup storage device.

The centralized database may be configured to receive a database server list. The database server list may include each database server. The centralized database may also be configured to receive a backup storage device list. The backup storage device list may include each backup storage device.

The centralized database may also be configured to receive a list of each hard drive memory utility included on each backup storage device. The centralized database may also be configured to receive a startup time of the most recent receipt of data associated with each backup storage device. The centralized database may also be configured to receive an internal backup end time associated with each database server.

The centralized database may also use a processor. The processor may determine a conflict. A conflict may be determined when the internal backup end time of a database server is after or simultaneous to the startup time of the connected backup storage device.

The processor may also determine an amount of time of the conflict.

The processor may also determine if the plurality of database servers is associated with at least one backup storage device.

The processor may also determine the CPU configuration rate of each CPU.

The processor may also determine a blank drive included on at least one of the plurality of backup storage devices.

The processor may also determine metadata associated with at least one blank hard drive memory utility.

The centralized database may also transmit a conflict message. The transmission may be in response to determination of a conflict.

The centralized database may also transmit a backup-required message. The transmission may be in response to determination that a database server is not associated with a backup storage device.

The centralized database may also be configured to transmit an increase CPU configuration message. The transmission may in response to determination that a CPU configuration rate of a CPU is greater than a predetermined rate.

The centralized database may also be configured to transmit an increase channel throughput message. The transmission may be in response to determination that a CPU configuration rate of a CPU is less than a predetermined rate.

The centralized database may also be configured to transmit a missing drive message. The missing drive message may include metadata associated with a blank drive. The transmission may be in response to determination that the blank drive is included on a backup storage device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 9 shows an illustrative Graphical User Interface ("GUI") in accordance with an embodiment of the invention;

FIG. 10 shows an illustrative GUI in accordance with an embodiment of the invention; and FIG. 11 shows an illustrative GUI in accordance with an embodiment of the invention.

DETAILED DESCRIPTION OF THE INVENTION

Figure 1:
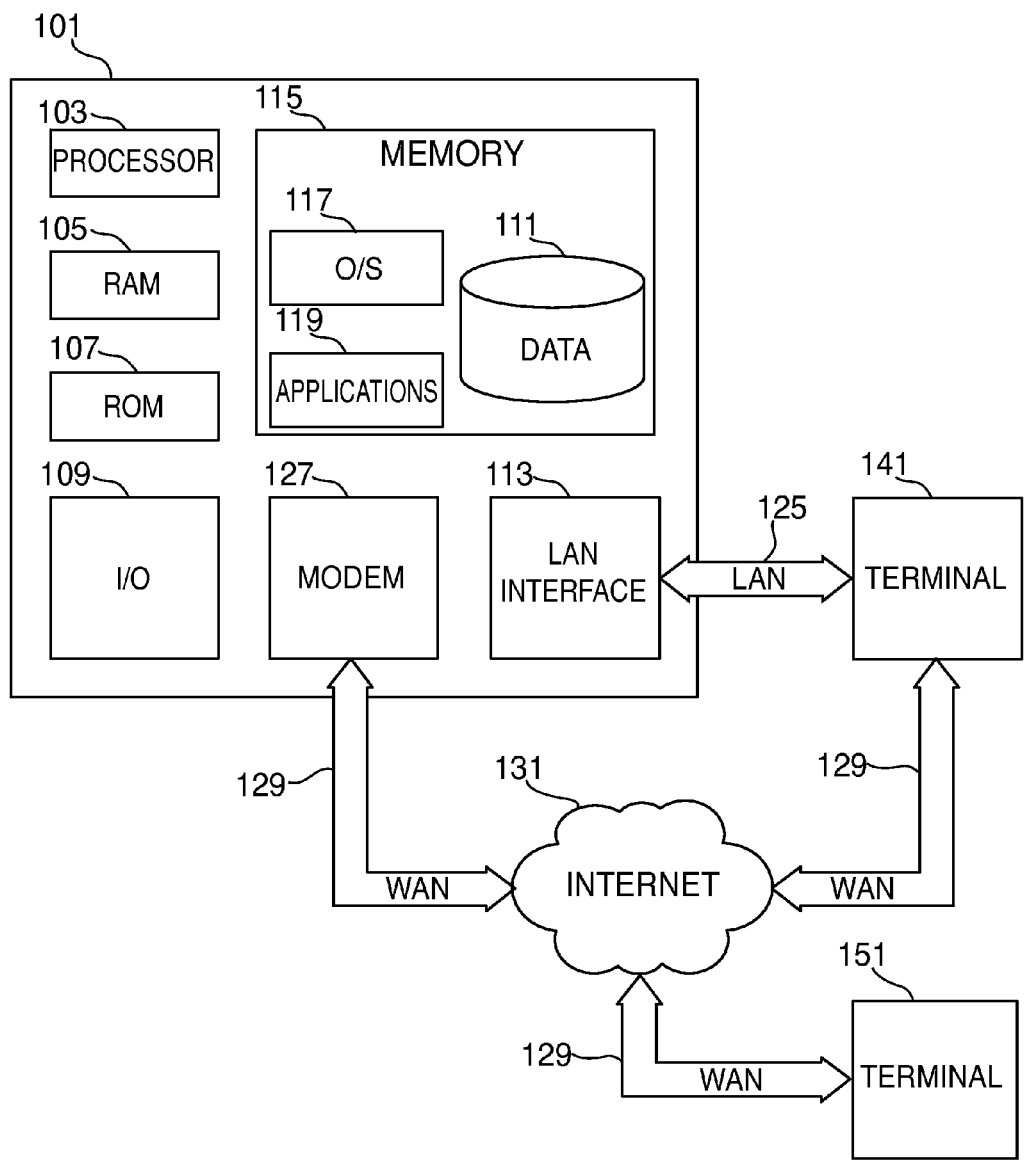
FIG. 1 shows an illustrative apparatus in accordance with the principles of the invention.

A centralized database system for maintaining redundancy for the information stored therein is provided. The centralized database system may include a centralized database. The centralized database system may also include a plurality of database servers. The centralized database system may also include a plurality of backup storage devices. The centralized database system may also include a plurality of CPUs.

In a first operational state the components of the centralized database system may interact in a specific fashion. The interactions may include interactions with each database server connected to the centralized database. The interactions may also include interactions with each backup storage device connected to the centralized database.

The interactions may also include interactions with each CPU associated with at least one backup storage device and at least one database server.

The interactions may also include at least once, during a predetermined amount of time, interactions within each database server. These interactions may internally backup data to an internal backup memory utility. The data may be stored within the database server.

The interactions may include at least once, during a predetermined amount of time, interactions with each database server and a backup storage device. These interactions may transmit the backed-up data. The transmission of data may be via a communications channel. The transmission of data may be to the backup storage device to which it is connected.

The interactions may also include each CPU configuration may control the speed of the transmission of the backed-up data to the backup storage device.

The interactions may also include the centralized database receiving information. The information may include a database server list. The database server list may include each database server included in the plurality of database servers. The database server list may also include each backup storage device included in the plurality of backup storage devices. The information may also include the database server to which each backup storage device is connected.

The information may also include a backup storage device list. The backup storage device list may include each backup storage device included in the plurality of backup storage devices. The information may also include a list of hard drive memory utilities included on each backup storage device. The information may also include, for each database server, an end time associated with the completion of the database server internally backing up the data stored within the database server to the internal backup memory utility.

The information may also include, for each database server, a startup time associated with the start of transmittal of the backed-up data to the backup storage device.

In a second operational state, the components of the centralized database system may interact in a specific fashion. The interactions may include the centralized database transmitting a conflict message to a database server. The transmission may be in response to the centralized database detecting that the start time of the transmission of the backed-up data is within a predetermined window of time.

The predetermined window of time may be determined relative to the internal backup end time of the database server.

In response to receipt of a conflict message by the database server, the database server may be configured to re-transmit the backed-up data to the backup storage device. The re-transmission may be initiated upon completion of the internal backup.

In some embodiments, the second operational state may include other interactions of components of the centralized database system. For example, the interactions may include the centralized database detecting a database server that is not associated with a backup storage device. In response to the detection, the centralized database may be configured to allocate a backup storage device to the database server. In response to the detection, the centralized database may also be configured to transmit a backup required message to the database server. The backup required message may include the allocated backup storage device. The backup required message may also include a schedule of times that the backup should take place.

In other embodiments, the second operational state may include other interactions between components of the centralized database system. The interactions may include other interactions between the centralized database system and a hard drive memory utility. For example, the interactions may include detecting an empty hard drive memory utility. The detection may be based on metadata. The hard drive memory utility may be included on a backup storage device. In response to the detection, the centralized database may be configured to retrieve the metadata associated with empty hard drive memory utility. In response to the detection, the centralized database may also determine what portion of data should be included on the hard drive memory utility. The determination of the portion of data may also include a determination of which database server houses the data that belongs on the empty hard drive memory utility. The determination may be based on the metadata. In response to the detection, the centralized database may also transmit a backup required message to the determined database server. The backup required message may include a portion of data to be included on the empty hard drive utility.

The centralized database system may operate in a third operational state. The third operational state may include interactions of one or more components of the centralized database system. The interactions may include interactions between the centralized database system and a CPU. For example, the centralized database may detect a CPU operating at less than a predetermined rate. In response to the detection, the centralized database may be configured to transmit an increase channel throughput message. The increase channel throughput message may include computer-readable instructions to increase the size of the communications channel associated with the CPU. The ability to increase the size of the channel may be proportional to the availability of additional processor cycles of the CPU. The increase in size of the communications channel may enable larger amounts of data to be transmitted and processed by the CPU.

In another embodiment, the third operational state may include other interactions of the components of the centralized database system. The interactions may include other interactions between the centralized database system and a CPU. For example, the interactions may include the centralized database system detecting a CPU operating at higher than a predetermined rate. In response to the detection, the centralized database may be configured to transmit an increase CPU configuration message to increase the CPU configuration. Increasing the CPU configuration may be based on the availability of additional processor cycles of the CPU. Increasing the CPU configuration may enable the CPU to operate faster, with more processor cycles per minute. Therefore, the CPU may enable a faster transfer of data.

In another embodiment, the third operational state may include other interactions between components of the centralized database system. The interactions may include other interactions between the centralized database system and a CPU. For example, the interactions may include the centralized database detecting a CPU operating at higher than a predetermined rate. In response to the detection, the centralized database may transmit a decrease channel throughput message. The decrease channel throughput message may include computer-readable instructions to decrease the size of a communications channel associated with the CPU. Decreasing the size of the communications channel may decrease the amount of data which may be transmitted through the communications channel. If a CPU is unable to process the transmission of data in a suitable manner, decreasing the amount of data may enable the CPU to process a smaller transmission of data in a more suitable manner.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115. Server 101 may include one or more receiver modules, server modules and processors that may be configured to receive data, metadata, lists of backup storage device, lists of database servers, calculate conflicts, identify missing servers, identify missing hard drive memory utility drives and perform any other suitable tasks related to ensuring redundancy of the data stored in a database.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown). As described in detail below, database 111 may provide storage for lists of database servers, lists of backup storage devices, metadata associated with the database servers, backup storage devices, and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service ("SMS"), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, smart phone, tablet, or any other suitable device for storing, transmitting and/or transporting relevant information.

Any information described above in connection with database 111, and any other suitable information, may be stored in memory 115.

One or more of applications 119 may include one or more algorithms that may be used to receive lists of backup storage devices, receive lists of database servers, identify conflicts, identify the configuration of CPUs, increase channel throughputs and perform any other suitable tasks related to maintaining redundancy of the data stored within a database server.

Figure 2:
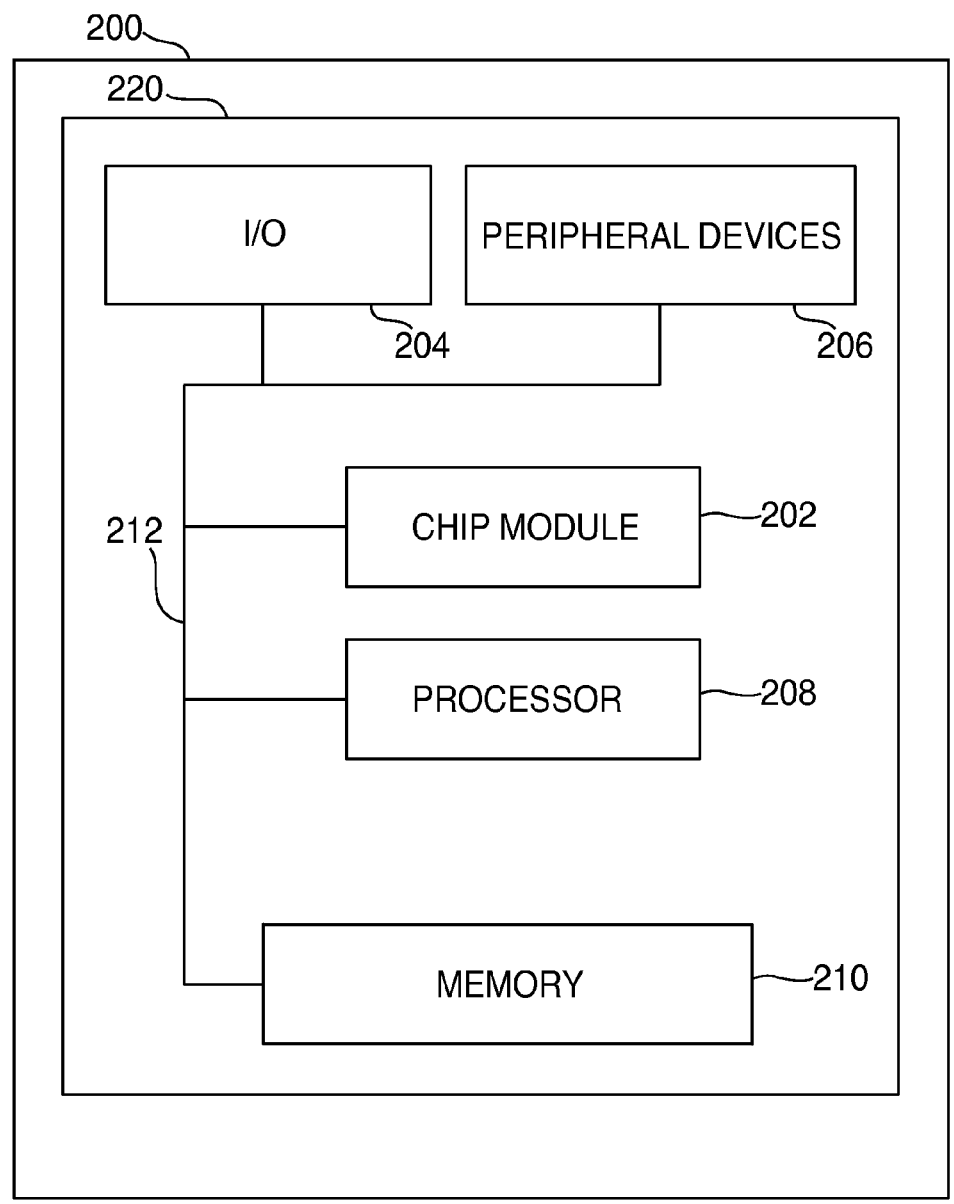
FIG. 2 shows illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, and machine-readable memory 210.

Machine-readable memory 210 may be configured to store in machine-readable data structures: information pertaining to a database servers, information pertaining to backup storage devices, the current time, information pertaining to CPUs, information pertaining to communications channels and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
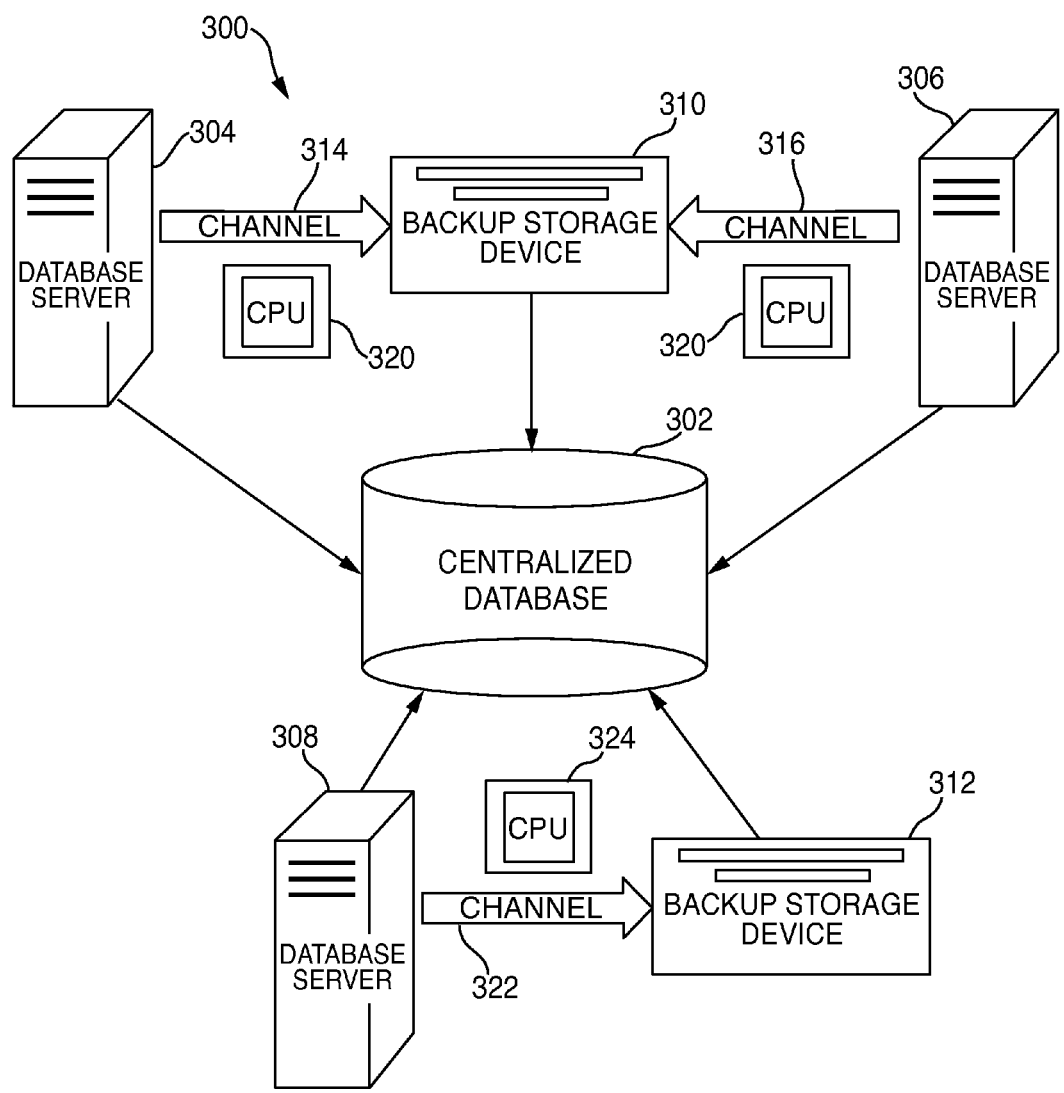
FIG. 3 shows an illustrative diagram in accordance with a the principles of the invention.

FIG. 3 shows a diagram illustrating centralized database system 300 according to certain embodiments. The centralized database system may include centralized database 302.

Centralized database system 300 may include database servers 304, 306 and 308. Centralized database system 300 may also include backup storage devices 310 and 312.

Database server 304 may transmit data to backup storage device 310, via channel 314. CPU 318 may control the speed of the transmission of data from database server 304 to backup storage device 310.

Database server 306 may also transmit data to backup storage device 310, via channel 316. CPU 320 may control the speed of the transmission of data from database server 306 to backup storage device 310.

Database server 308 may transmit data to backup storage device 312, via channel 322. CPU 324 may control the speed of the transmission of data from database server 308 to backup storage device 312.

Centralized database 302 may receive information, data, metadata, transmission speed data, memory utility data and any other suitable data and/or information from database servers 304, 306 and 308 and backup storage devices 310 and 312.

Centralized database 302 may also receive data pertaining to the CPU configuration of CPUs 318, 320 and 322 from CPUs 318, 320 and 322. Centralized database 302 may also receive data from channels 314, 316 and 322. Centralized database 302 may also transmit instructions, messages, information and/or data to database servers 304, 306 and 308, backup storage devices 310 and 312, CPUs 318, 320 and 324 and/or channels 314, 316 and 322.

Centralized database 302 may determine if each CPU is operating at an optimum rate. An optimum rate for a CPU may be a CPU configuration of 80-90%. Centralized database 302 may attempt to optimize, by attaining a CPU configuration of 80-90%, the performance of the CPUs. Centralized database 302 may allocate CPUs to data transfer jobs as needed. Database server 304 may have an average backup time or data transmission time of 16 hours. Therefore, CPU 318 may require more processor cycles to complete the data transmission than CPU 320. CPU 320 may be associated with database server 306, which may have an average backup time of two hours. Therefore, the centralized database system 300 may attempt to optimize performance. The optimization may include the centralized database allocating a data transmission job to CPU 320. The data transmission job may be executing data transmission from database server 304 to backup storage device 310. The allocation may occur upon completion of the two hour data transmission. The allocation of CPU 320 may assist CPU 318 to complete the data transmission in a more timely manner.

Also, centralized database system 302 may determine if a CPU configuration is greater than an optimum rate, an advantageous rate or a predetermined rate. If a CPU configuration is operating at greater than an optimum or predetermined rate, the centralized database may also allocate an additional processor to assist the CPU to operate at a predetermined configuration.

In some embodiments, when a CPU is operating at a configuration greater than optimum, centralized database 302 may transmit an instruction to the associated database server to reduce the data throughput of the channel associated with the CPU.

In some embodiments, when a CPU is operating at a less than optimum configuration, or less than predetermined configuration, centralized database 302 may transmit an instruction to the associated database server to increase the data throughput of the channel associated with the CPU.

Figure 4:
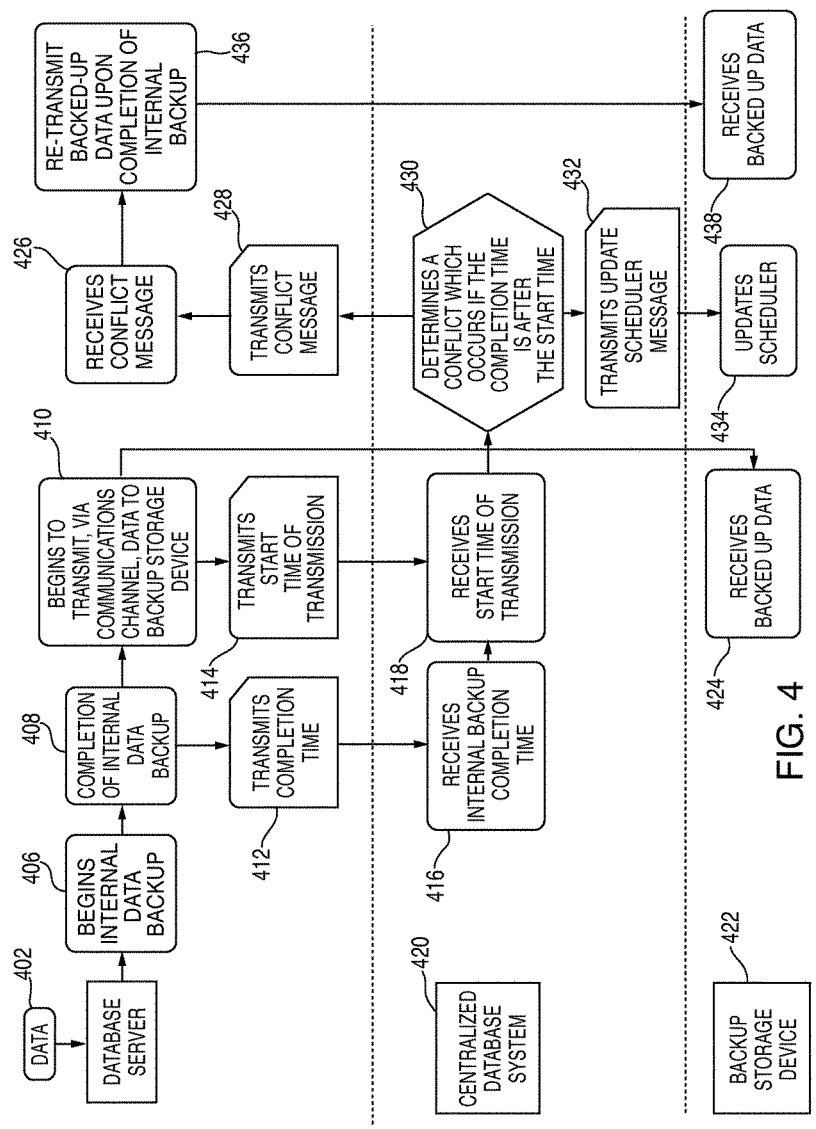
FIG. 4 show illustrative flow chart in accordance with the principles of the invention.

FIG. 4 shows an illustrative flow chart depicting a conflict scenario. Database server 404 may receive data 402. Database server 404 may begin an internal data backup, as shown at 406. The internal data backup may ensure that data 402 is processed and stable (not live data). Database server 404 may complete the internal data backup, as shown at 408.

Database server may transmit the completion time of the internal data backup to centralized database 420, as shown at 412. Step 416 shows centralized database 420 may receive the internal backup completion time.

Database server 404 may begin to transmit the backed-up data to a backup storage device 422, as shown at 410. The transmission may be via a communications channel. Database server 404 may also transmit the start time of the data transmission to centralized database 420, as shown at 414. Centralized database 420 may receive the start time of the transmission, as shown at step 418.

Centralized database 420 may determine whether a conflict occurred, as shown at 430. A conflict may occur if the transmission of the data to the backup storage device occurs before the completion of the internal data backup. A conflict may also occur if the transmission of the data to the backup storage device occurs within a predetermined amount of time of the completion of the internal data backup. If a conflict occurs, the transmitted data may be live data—i.e., data that was not internally backed-up. If live data is transmitted, the data stored in the backup storage device may be unstable, incomplete and/or inconsistent. There is a concern of losing essential data if a conflict occurs.

If centralized database 420 determines that a conflict has indeed occurred, centralized database 420 may transmit a conflict message to database server 404, as shown at 428. In addition, centralized database 420 may also transmit an update scheduler message to backup storage device 422, as shown at 432.

Database server 404 may receive the conflict message, as shown at 426. In response to receipt of the conflict message, database server 404 may re-transmit the backed-up data to backup storage device 422, upon completion of the internal backup, as shown at 436. Backup storage device 422 may re-receive the backed-up data, as shown at 438.

In some embodiments, backup storage device 422 may receive an update scheduler message, as shown at 434. In response to the message, backup storage device 422 may update the scheduler of the data transmission. The scheduler may determine what time the transmission of the backed-up data, from database server 404 to backup storage device 422, occurs. The scheduler may be updated so that the data transmission occurs after the internal data backup was completed. The scheduler may also be updated to include incremented backups. Incremented backups may be for backing up large amounts of data. The incremented backup may include dividing the large amounts of data into smaller concrete sections, and backing up each of the smaller concrete sections.

In some embodiments, centralized database system 420 may update the scheduler itself. In other embodiments, database server 404 may update the scheduler.

Figure 5:
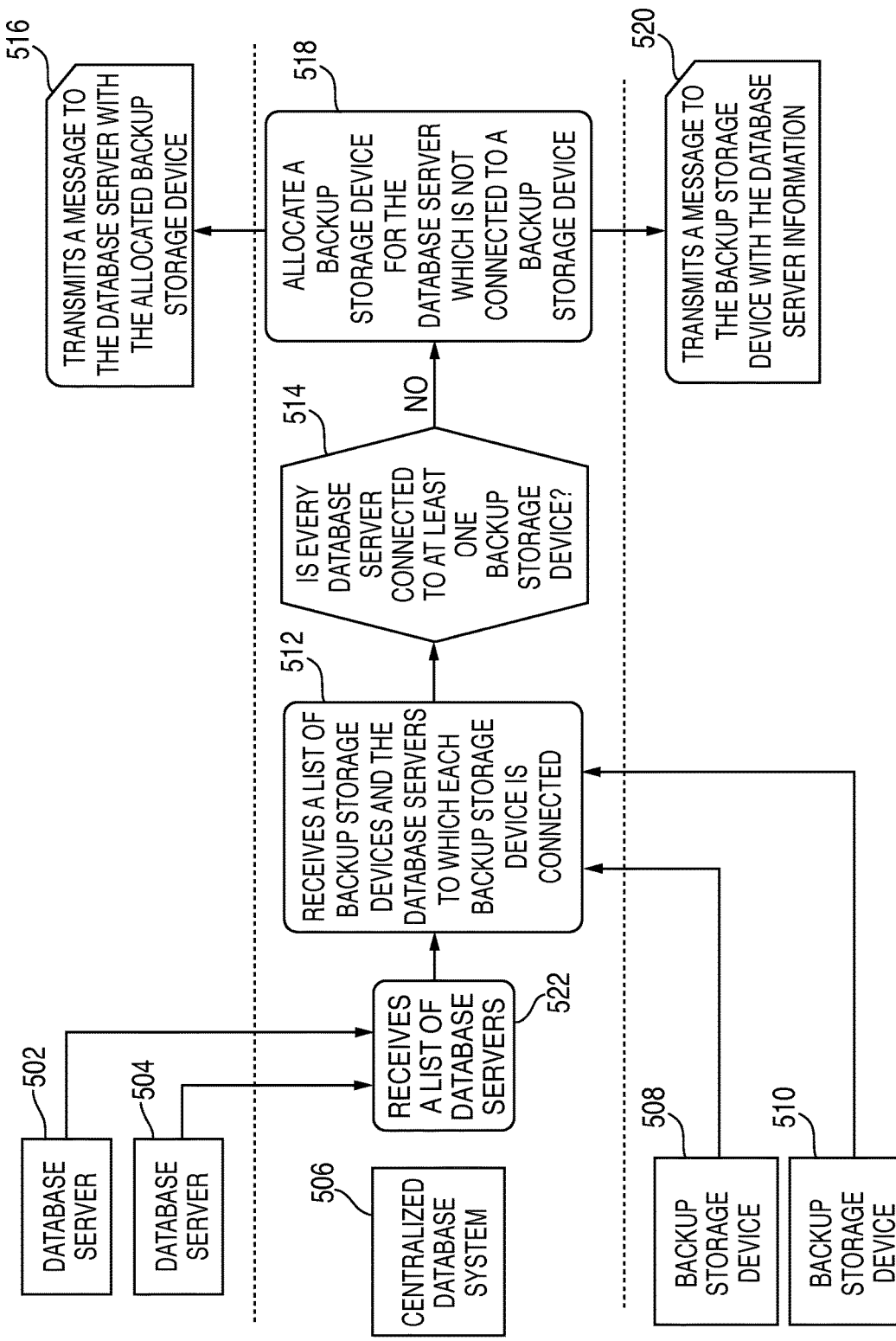
FIG. 5 shows illustrative flow chart in accordance with the principles of the invention.

FIG. 5 shows an embodiment of the centralized database system. In this embodiment, the centralized database may identify database servers which may not be connected to backup storage devices. The centralized database may allocate a backup storage device for the database server which may not be connected to a backup storage device.

Centralized database system 506 may receive a list of database servers, as shown at 522. The list may include database servers 502 and 504. Centralized database system 506 may also receive a list of backup storage devices, as shown at 512. The list of backup storage devices may include backup storage devices 508 and 510.

The list of backup storage devices may include the database servers to which each backup storage device is connected or coupled, as shown at 512.

Centralized database 506 may also determine if every database server is connected to at least one backup storage device, as shown at 514. If at least one database server is not connected to at least one backup storage device, centralized database 506 may allocate a backup storage device for the at least one database server which is not connected to a backup storage device, as shown at 518.

Centralized database 506 may transmit a message to the database server which was not connected to a backup storage device. The message may include the allocated backup storage device, as shown at 516.

Centralized database 506 may also transmit a message to the backup storage device which was allocated for the identified database server. The message may include the database server information, as shown at 520.

Figure 6:
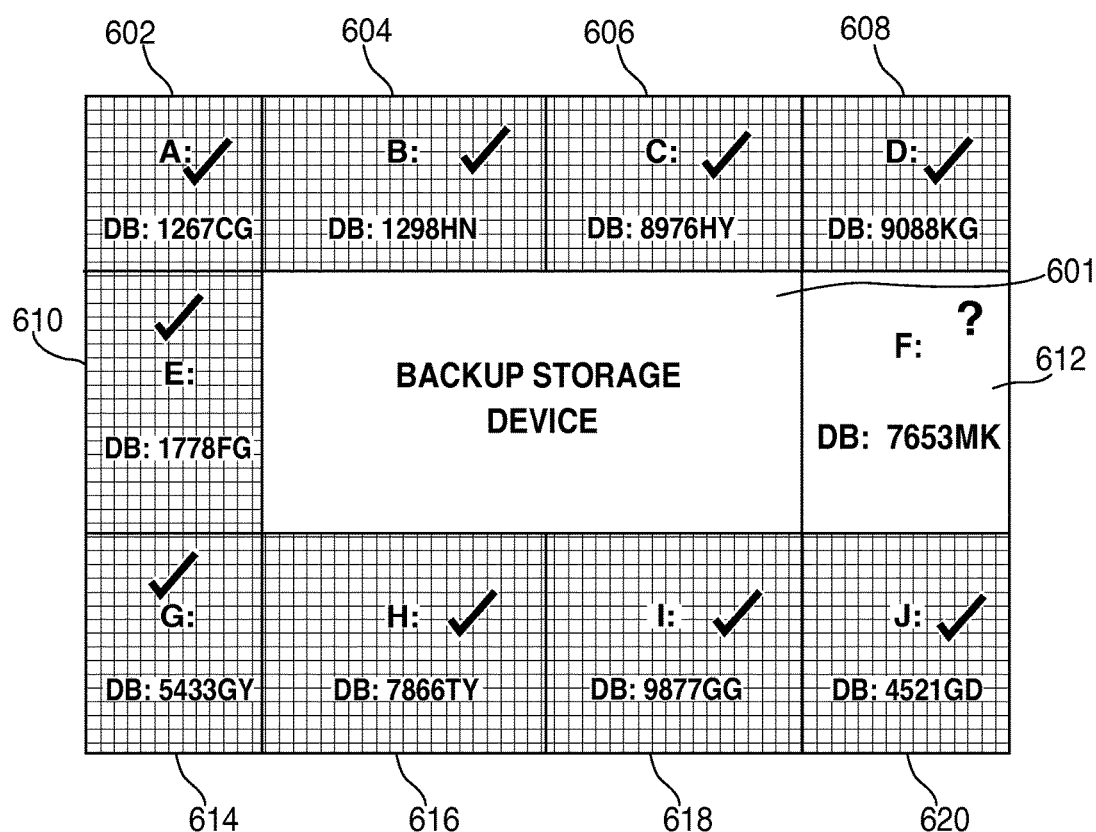
FIG. 6 shows an illustrative diagram in accordance with the principles of the invention.

FIG. 6 shows a backup storage device. Backup storage device 601 may include a plurality of hard drive memory utilities 602, 604, 606, 608, 610, 612, 614, 616, 618 and 620. Hard drive memory utility 602, or "drive A", may store data corresponding to database 1267CG. The shaded portion and the check may indicate that there currently is data on "drive A".

Hard drive memory utility 604, or "drive B", may store data corresponding to database 1298HN. The shaded portion and the check may indicate that there currently is data on "drive B".

Hard drive memory utilities 606, 608, 610, 614, 616, 618 and 620 may also contain data from each hard drive memory utilities' corresponding database as indicated by the check and shaded background.

Hard drive memory utility 612, or "drive F", may be configured to store data corresponding to database 7653MK. The question mark and unshaded portion corresponding to "drive F" may indicate that "drive F" may currently be blank, or lacking data. In other embodiments, the question mark or unshaded portion corresponding to "drive F" may indicate that "drive F" does not contain updated data.

Figure 7:
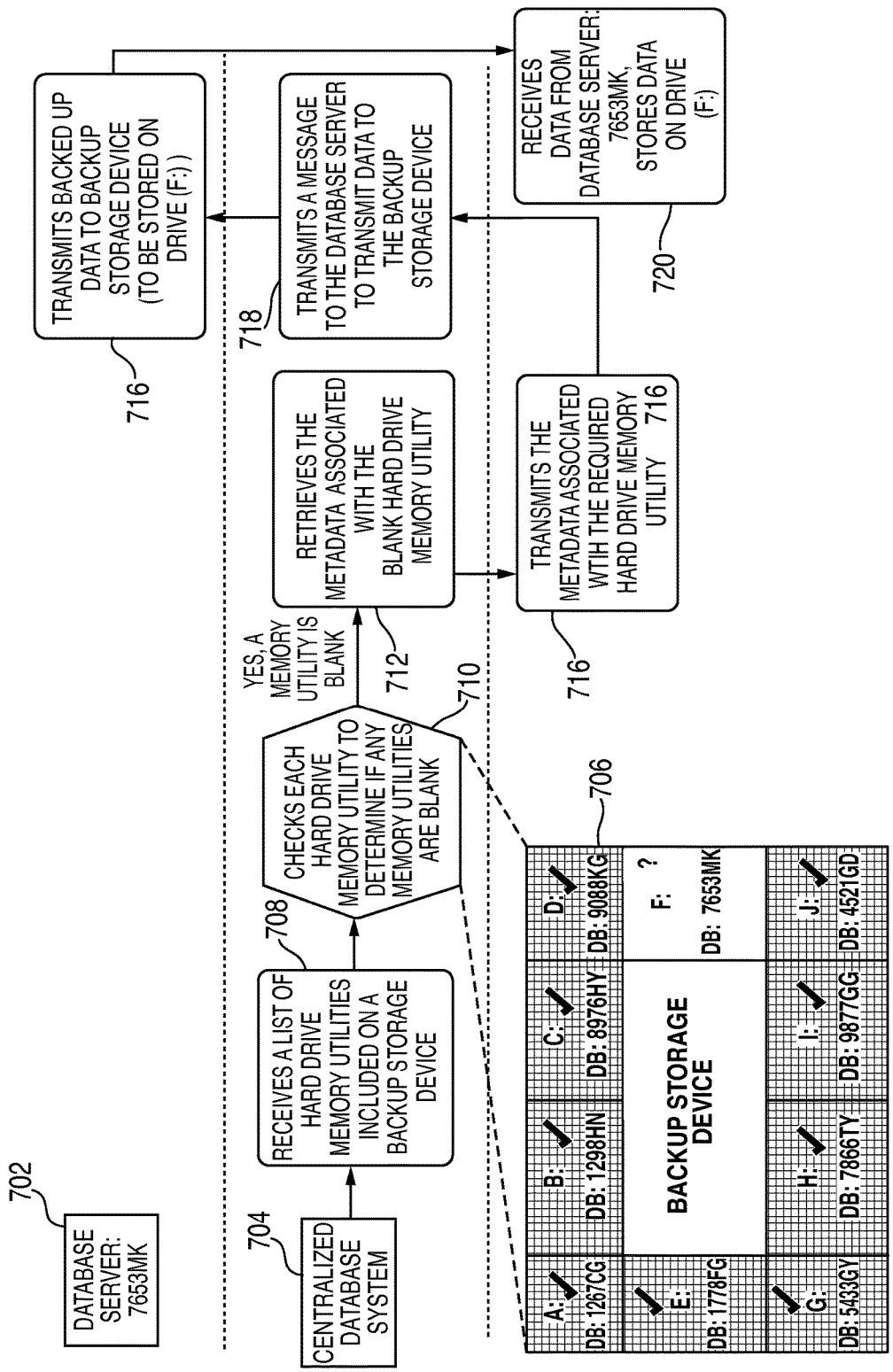
FIG. 7 shows an illustrative flow chart in accordance with the principles of the invention.

FIG. 7 shows an embodiment, where centralized database 704 identifies, and stores the appropriate data on a blank drive backup storage device 706. Backup storage device 706 may be substantially similar to backup storage device 601, of FIG. 6, which has been described above in detail.

Centralized database 704 may receive a list of hard drive memory utilities included on backup storage device 706, as shown at 708. Centralized database may check each hard drive memory utility, of backup storage device 706, to determine if any hard drive memory utilities are blank. Centralized database 704 may have identified "drive F" as a blank drive.

Centralized database 704 may retrieve metadata associated with the blank hard drive memory utility (drive F), as shown at 712. Backup storage device 706 may transmit the metadata associated with the requested hard drive memory utility (drive F), as shown at 714. The metadata may correspond to the database identifier (7653MK).

Centralized database 704 may transmit a message to database server 702 with identifier 7653MK. The message may be to transmit data to the backup storage device, as shown at 718.

Database server 702 identified by database identifier 7653MK, may transmit backed-up data to backup storage device 706, to be stored on "drive F", as shown at 716. Backup storage device 706 may receive data from database server 7653MK, and store the data on "drive F", as shown at 720.

Figure 8:
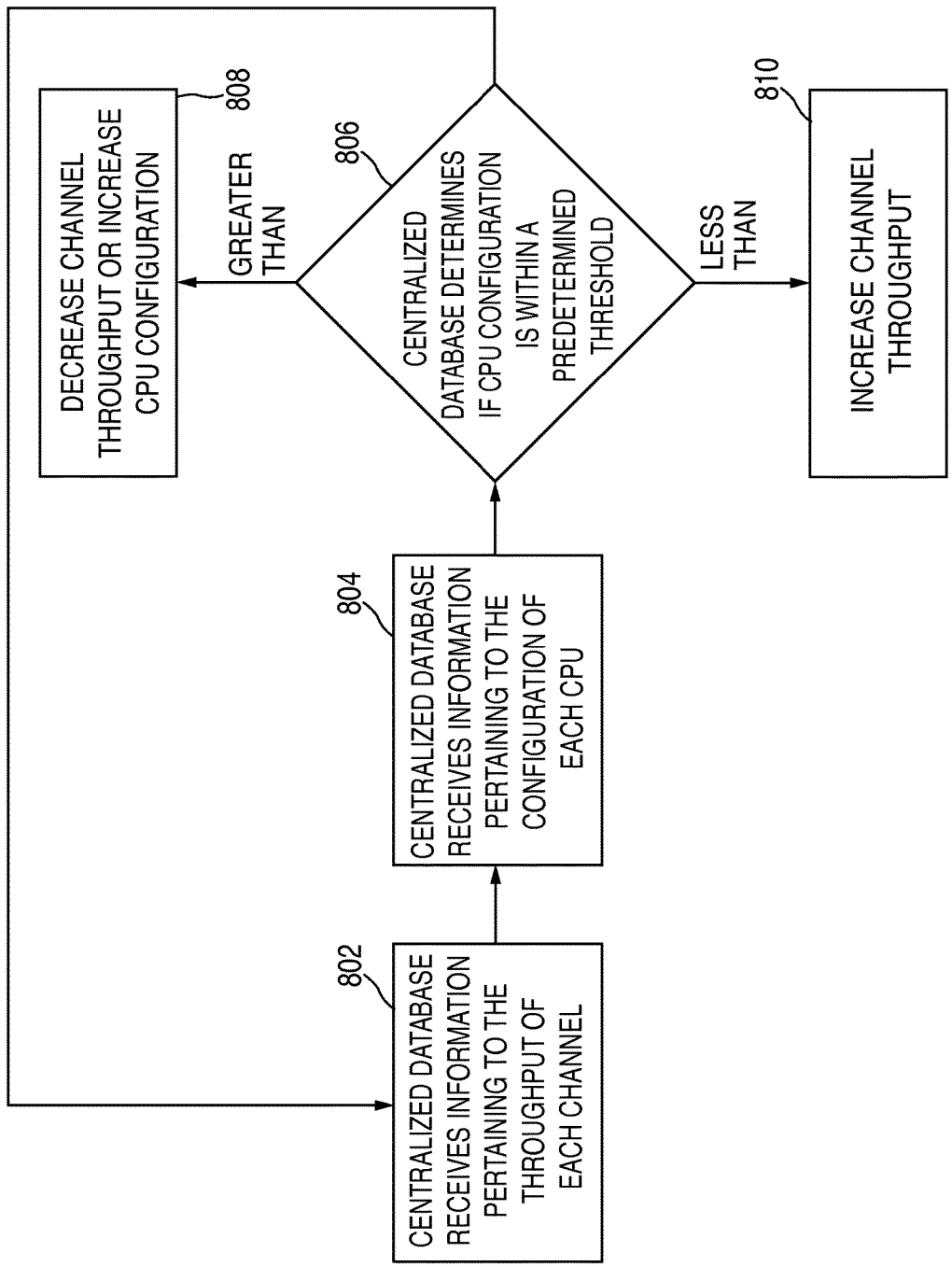
FIG. 8 shows an illustrative flow chart in accordance with the principles of the invention.

FIG. 8 shows an illustrative flow chart. Step 802 shows a centralized database receives information pertaining to the throughput of each channel included in the centralized database system.

The centralized database may also receive information pertaining to the configuration of each CPU, included in the centralized database system, as shown at 804. The centralized database may determine, for each CPU, if the CPU configuration is within a predetermined window, above a predetermined threshold and/or below a predetermined threshold, as shown at 806. If the CPU configuration is within a predetermined threshold, the process may return to step 802.

If the CPU configuration is greater than a predetermined threshold, the centralized database may decrease channel throughput, as shown at step 808. If the CPU configuration is greater than a predetermined threshold, the centralized database may increase the CPU configuration, as shown at 808.

If the CPU configuration is less than a predetermined threshold, the centralized database may increase channel throughput, as shown at 810.

FIG. 9 shows a GUI associated with the centralized database system. The GUI may relate to potential conflicts. The GUI may assist a user in identifying conflicts. The GUI may present to the user information in a clear and easy-to-read manner.

The GUI may relate to a conflict screen, as shown at 902. The GUI may include view tab 904, properties tab 906, history tab 908 and subscriptions tab 910.

The GUI may be associated with view tab 904.

The GUI may include a table. The table may include column 912. Column 912 may include a list of SQL (Structured Query Language) database servers. Column 912 may also include a list of other databases, which are not SQL database servers. The table may also include column 914. Column 914 relate to DPA_Startime. DPA_Startime may be the start up time of the receipt of data at the backup storage device.

The table may also include column 916. Column 916 may relate to SQL_Backup_End. SQL_Backup_End may be the internal backup end time of each SQL server included in column 912.

The table may also include column 918. Column 918 may relate to conflict in hours. A conflict in hours may be the amount of time (in hours) from the end time of the SQL backup to the start time of the backup storage device. A conflict in hours with a value greater than zero may indicate that the start time of the receipt of data at the backup storage device may have begun substantially after the completion of the internal database backup—i.e., there was no conflict. A conflict in hours with a value less than or equal to zero may indicate that the start time of the receipt of data at the backup storage device may have begun substantially simultaneous to, or before the completion of the internal database backup—i.e., there is a potential conflict.

The table may also include column 920. Column 920 may relate to whether there is a conflict. If the conflict in hours is greater than zero, column 920 may indicate that there is no conflict (NO). If the conflict in hours is less than or equal to zero, column 920 may indicate that there is a conflict (YES).

Row 922 shows an example of NO conflict. As indicated in column 916, server 04BATAR6 may have completed the internal backup on Feb. 16, 2015 at 8:00:10 PM. Server 04BATAR6 may have begun transmission of data to the backup storage device on Feb. 17, 2015 at 12:05:00 AM, as shown in column 914. The difference between 8:00:10 PM and 12:05:00 AM is approximately four hours, as indicated in column 918. Therefore, because there may have been a substantial lapse of time between the end time of internal backup and the startup time of the backup storage device, there is NO conflict, as indicated in column 920.

Row 924 shows an example of a conflict. As indicated in column 916, server CRPQ00041 may have completed the internal backup on Feb. 17, 2015 at 5:10:20 AM, as shown in column 916. Server CRPQ00041 may have begun the transmission of data to the backup storage device on Feb. 17, 2015 at 12:00:00 AM, as shown in column 914. The difference between the end time of the internal backup and the start time of the backup storage device may be negative five, as indicated in column 918. Therefore, because there is a difference of less than zero—i.e., the backup storage device received data prior to completion of the internal backup, a YES conflict is noted in column 920.

Row 926 shows an example of a conflict. As indicated in column 916, server BHOAC6IL may have completed the internal backup on Feb. 16, 2015 at 9:00:31 PM, as shown in column 916. Server BHOAC6IL may have begun transmission of data to the backup storage device on Feb. 16, 2015 at 9:04:00 PM, as shown in column 914. The difference between the end time of the internal backup and the start time of the backup storage device is approximately three minutes. Because three minutes is within a predetermined window of time from the end time of the internal backup, the system may maintain that there is a conflict, as indicated in column 920 (YES conflict).

FIG. 10 shows a GUI. The GUI may be associated with the centralized database system. The GUI may relate to potential missing servers, as shown at 1002. The GUI may assist a user in identifying missing servers. The GUI may present information to the user in a clear and easy-to-read manner.

The GUI may include view tab 1004, properties tab 1006, history tab 1008 and subscriptions tab 1010.

The GUI may include a table. The table may include column 1012. Column 1012 may relate to a list of SQL servers. The table may include column 1014. Column 1014 may relate to a list of DPA servers. DPA servers may be tape backup storage devices.

The table may include row 1016. Row 1016 may indicate that SQL server TLWASQGO may be backed-up at DPA server BHWACWS3. This may indicate that SQL server has a backup storage device associated with it.

The table may also include row 1018. Row 1018 may aindicate that SQL server YCTNIIQ53V1 may not be backed-up to a backup storage device. Therefore, the centralized database system may allocate a DPA server for SQL server YCTNIIQ53V1. The centralized database may also transmit a message to both SQL server YCTNIIQ53V1 and the allocated DPA server to notify the servers of the connection.

FIG. 11 shows an illustrative GUI. The GUI may be associated with the centralized database system. The GUI may relate to potential missing drives, as shown at 1102. The GUI may assist a user in identifying missing drives. The GUI may present information to the user in a clear and easy-to-read manner.

The GUI may include view tab 1104, properties tab 1106, history tab 1108 and subscriptions tab 1110.

The GUI may include a table. The table may include column 1112. Column 1112 may include a list of SQL servers. The table may also include column 1114. Column 1114 may include a list of SQL backup paths. A SQL backup path may be a computer address which references a portion of the data stored on the SQL server.

The table may also include column 1116. Column 1116 may relate to DPA Inclusion T. DPA Inclusion T may be which hard drive memory utility, the data, referenced by the backup path, should be included on the backup storage device.

The table may also include column 1118. Column 1118 may relate to missing drives. The GUI may inform a user if the drive referenced by column 1116, DPA Inclusion T, is blank or missing data.

Row 1120 shows a SQL server 04BATAR6. Some of the data stored on SQL server 04BATAR6 may be set up to be stored on hard drive memory utility "A:\". The data which may be projected to be stored on "drive A" may be referenced by backup path "A:\MSSQL:SEL\UP\WN". The centralized database may check hard drive memory utility "A:\" to determine if the drive is missing data.

If the drive is missing data, the GUI may present "YES" in column 1118. If the drive has data, the GUI may present "NO" in column 1118.

During the data transmission process, if a section of data is not able to be transmitted, the centralized database may leave a drive blank. The purpose of including a drive with blank data may be to alert the centralized database that there is data missing from the drive. The centralized database may easily retrieve the missing data because the centralized database may identify the projected source of the data via metadata associated with the drive.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, tablets, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, systems and methods for a centralized database system have been provided. Persons skilled in the art will appreciate that the present invention can be practiced by other than the described embodiments, which are presented for purposes of illustration rather than of limitation. The present invention is limited only by the claims that follow.

What is claimed is:

1. A centralized database system for maintaining redundancy for the information stored therein, the system comprising:
   a centralized database;
   a plurality of database servers;
   a plurality of backup storage devices;
   a plurality of central processing units ("CPUs"); wherein:
      each CPU is associated with:
         at least one backup storage device, included in the plurality of backup storage devices; and
         at least one database server, included in the plurality of database servers;
      each database server, included in the plurality of database servers, is connected, via a communications channel, to a backup storage device, included in the plurality of backup storage devices;
      each database server, included in the plurality of database servers is configured to transmit data, via the communications channel, to the connected backup storage device; and
      the centralized database is configured to:
         receive:
            a database server list comprising each database server included in the plurality of database servers;
            a backup storage device list comprising each backup storage device included in the plurality of backup storage devices;
            a list of each hard drive memory utility included on each backup storage device included in the plurality of backup storage devices;
            a startup time of the most recent receipt of data associated with each backup storage device; and
            an internal backup end time associated with each database server;
         use a processor to determine:
            a conflict when the internal backup end time of a database server is after or simultaneous to the startup time of the connected backup storage device;
            an amount of time of the conflict;
            if the plurality of database servers is associated with at least one backup storage device;
            the CPU configuration rate of each CPU;
            a blank drive included on at least one of the plurality of backup storage devices; and
            metadata associated with at least one blank hard drive memory utility; and
         transmit:
            a conflict message in response to determination of a conflict;
            a backup-required message, in response to determination that a database server, from the plurality of database servers, is not associated with a backup storage device;
            an increase CPU configuration message, in response to determination that the CPU configuration rate of a CPU, included in the plurality of CPUs, is greater than a predetermined rate;
            an increase channel throughput message, in response to determination that the CPU configuration rate of a CPU, included in the plurality of CPUs, is less than predetermined rate; and
            a missing drive message, comprising the metadata associated with the blank drive, in response to a determination that a blank drive is included on at least one of the backup storage devices.

2. A centralized database system for maintaining redundancy for the information stored therein, the system comprising:
   a centralized database;
   a plurality of database servers;
   a plurality of backup storage devices;
   a plurality of central processing units ("CPUs"); wherein:
      in a first operational state:
         each database server, included in the plurality of database servers is connected to the centralized database;
         each backup storage device, included in the plurality of backup storage devices is connected to the centralized database;
         each CPU, included in the plurality of CPUs, is associated with at least one backup storage device and at least one database server, included in the plurality of database servers;
         at least once, during a predetermined amount of time, each database server internally backs up the data, stored within the database server, to an internal backup memory utility;
         at least once, during a predetermined amount of time, each database server is configured to transmit, via a communications channel, the backed-up data to the backup storage device to which it is connected, included in the plurality of backup storage devices; and
         each CPU configuration, said configuration which controls the speed of the transmission of the backed-up data to the backup storage device;

the centralized database receives information comprising:
- a database server list comprising:
  - each database server included in the plurality of database servers; and
  - each backup storage device, included in the plurality of backup storage devices, and the database server to which each backup storage device is connected;
- a backup storage device list comprising each backup storage device included in the plurality of backup storage devices;
- a list of hard drive memory utilities included on each backup storage device included in the plurality of backup storage devices;
- for each database server, an end time associated with the completion of said database server internally backing up the data stored within said database server to the internal backup memory utility; and
- for each database server, a startup time associated with the start of transmittal of the backed-up data to the backup storage device; and in a second operational state:
- in response to the centralized database detecting that the start time, of the transmission of the backed-up data from the database server, is within a predetermined window of time with respect to the internal backup end time of the same database server, the centralized database is configured to transmit a conflict message to said database server.

3. The system of claim 2, wherein in response to receipt of the conflict message by the database server, the database server is configured to re-transmit, upon completion of the internal backup, the backed-up data to the backup storage device.

4. The system of claim 2, further comprising a third operational state, wherein in the third operational state, in response to the centralized database detecting a CPU operating at less than a predetermined rate, the centralized database is configured to transmit an increase channel throughput message, the message comprising computer-readable instructions to increase the size of the communications channel associated with the CPU.

5. The system of claim 2, further comprising a third operational state, wherein in the third operational state, in response to the centralized database detecting a CPU operating higher than a predetermined rate, the centralized database is configured to transmit an increase CPU configuration message to increase the CPU configuration.

6. The system of claim 2, further comprising a third operational state, wherein in the third operational state, in response to the centralized database detecting a CPU operating higher than a predetermined rate, the centralized database is configured to transmit a decrease channel throughput message, the message comprising computer-readable instructions to decrease the size of a communications channel associated with the CPU.

7. A centralized database system for maintaining redundancy for the information stored therein, the system comprising:
- a centralized database;
- a plurality of database servers;
- a plurality of backup storage devices;
- a plurality of central processing units ("CPUs"); wherein:
  in a first operational state:
  - each database server, included in the plurality of database servers is connected to the centralized database;
  - each backup storage device, included in the plurality of backup storage devices is connected to the centralized database;
  - each CPU, included in the plurality of CPUs, is associated with at least one backup storage device and at least one database server, included in the plurality of database servers;
  - at least once, during a predetermined amount of time, each database server internally backs up the data, stored within the database server, to an internal backup memory utility;
  - at least once, during a predetermined amount of time, each database server is configured to transmit, via a communications channel, the backed-up data to the backup storage device to which it is connected, included in the plurality of backup storage devices; and
  - each CPU configuration, said configuration which controls the speed of the transmission of the backed-up data to the backup storage device;

the centralized database receives information comprising:
  - a database server list comprising:
    - each database server included in the plurality of database servers; and
    - each backup storage device, included in the plurality of backup storage devices, and the database server to which the backup storage device is connected;
  - a backup storage device list comprising each backup storage device included in the plurality of backup storage devices;
  - a list of hard drive memory utilities included on each backup storage device included in the plurality of backup storage devices;
  - for each database server, an end time associated with the completion of said database server internally backing up the data stored within said database server to the internal backup memory utility; and
  - for each database server, a startup time associated with the start of transmittal of the backup data to the backup storage device; and in a second operational state:
  - in response to the centralized database detecting a database server that is not associated with a backup storage device, included in the plurality of backup storage devices, the centralized database is configured to:
    - allocate a backup storage device to the database server; and
    - transmit a backup required message to the database server comprising the allocated backup storage device.

8. The system of claim 7, further comprising a third operational state, wherein in the third operational state, in response to the centralized database detecting a CPU operating at less than a predetermined rate, the centralized database is configured to transmit an increase channel throughput message, the message comprising computer-readable instructions to increase the size of the communications channel associated with the CPU.

9. The system of claim 7, further comprising a third operational state, wherein in the third operational state, in response to the centralized database detecting a CPU operating higher than a predetermined rate, the centralized database is configured to transmit an increase CPU configuration message to increase the CPU configuration.

10. The system of claim 7, further comprising a third operational state, wherein in the third operational state, in response to the centralized database detecting a CPU operating higher than a predetermined rate, the centralized database is configured to transmit a decrease channel throughput message, the message comprising computer-readable instructions to decrease the size of a communications channel associated with the CPU.

11. A centralized database system for maintaining redundancy for the information stored therein, the system comprising:
- a centralized database;
- a plurality of database servers;
- a plurality of backup storage devices;
- a plurality of central processing units ("CPUs"); wherein:
  in a first operational state:
  - each database server, included in the plurality of database servers is connected to the centralized database;
  - each backup storage device, included in the plurality of backup storage devices is connected to the centralized database;
  - each CPU, included in the plurality of CPUs, is associated with at least one backup storage device and at least one database server, included in the plurality of database servers;
  - at least once, during a predetermined amount of time, each database server internally backs up the data, stored within the database server, to an internal backup memory utility;
  - at least once, during a predetermined amount of time, each database server is configured to transmit, via a communications channel, the backed-up data to the backup storage device to which it is connected, included in the plurality of backup storage devices; and
  - each CPU configuration, said configuration which controls the speed of the transmission of the backed-up data to the backup storage device;
  the centralized database receives information comprising:
  - a database server list comprising:
    - each database server included in the plurality of database servers; and
    - each backup storage device, included in the plurality of backup storage devices, and the database server to which the backup storage device is connected;
  - a backup storage device list comprising each backup storage device included in the plurality of backup storage devices;
  - a list of hard drive memory utilities included on each backup storage device included in the plurality of backup storage devices;
  - for each database server, an end time associated with the completion of said database server internally backing up the data stored within said database server to the internal backup memory utility; and
  - for each database server, a startup time associated with the start of transmittal of the backup data to the backup storage device; and
  in a second operational state:
  - in response to the centralized database detecting an empty hard drive memory utility included on a backup storage device, included in the plurality of backup storage devices, the centralized database is configured to:
    - retrieve the metadata associated with the empty hard drive memory utility;
    - determine, based on the metadata, what portion of data from which database server, should be included in the empty hard drive memory utility; and
    - transmit, to the determined database server, a backup required message, the backup required message including the portion of data to be included on the empty hard drive utility.

12. The system of claim 11, further comprising a third operational state, wherein in the third operational state, in response to the centralized database detecting a CPU operating at less than a predetermined rate, the centralized database is configured to transmit an increase channel throughput message, the message comprising computer-readable instructions to increase the size of the communications channel associated with the CPU.

13. The system of claim 11, further comprising a third operational state, wherein in the third operational state, in response to the centralized database detecting a CPU operating higher than a predetermined rate, the centralized database is configured to transmit an increase CPU configuration message to increase the CPU configuration.

14. The system of claim 11, further comprising a third operational state, wherein in the third operational state, in response to the centralized database detecting a CPU operating higher than a predetermined rate, the centralized database is configured to transmit a decrease channel throughput message, the message comprising computer-readable instructions to decrease the size of a communications channel associated with the CPU.

* * * * *